(12) United States Patent
Sato

(10) Patent No.: US 6,418,295 B1
(45) Date of Patent: Jul. 9, 2002

(54) COLOR IMAGE FORMING APPARATUS CAPABLE OF EFFICIENTLY SENSING A COLOR DEVIATION AND ACCURATELY CORRECTING IT

(75) Inventor: Toshiya Sato, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 09/550,802

(22) Filed: Apr. 18, 2000

(30) Foreign Application Priority Data

Apr. 19, 1999 (JP) .......................................... 11-110915

(51) Int. Cl.$^7$ .............................................. G03G 15/01
(52) U.S. Cl. ....................................... 399/301; 347/116
(58) Field of Search .......................... 347/116; 399/301, 399/44, 49, 299

(56) References Cited

U.S. PATENT DOCUMENTS

| | | | |
|---|---|---|---|
| 5,444,525 A | * 8/1995 | Takahashi et al. ............. | 399/76 |
| 5,737,665 A | 4/1998 | Sugiyama et al. ............. | 399/39 |
| 5,765,083 A | 6/1998 | Shinohara .................... | 399/301 |
| 5,799,228 A | 8/1998 | Iwata et al. .................... | 399/94 |
| 5,872,586 A | * 2/1999 | Shio ............................ | 347/116 |
| 5,875,380 A | 2/1999 | Iwata et al. | |
| 5,881,346 A | * 3/1999 | Mori et al. ................... | 399/301 |
| 6,118,557 A | 9/2000 | Sugiyama et al. ........... | 358/504 |
| 6,142,690 A | 11/2000 | Yoshimura et al. ...... | 400/636.2 |

FOREIGN PATENT DOCUMENTS

| | | | |
|---|---|---|---|
| JP | 06-051607 | * | 2/1994 |
| JP | 10-213943 | | 8/1998 |

* cited by examiner

*Primary Examiner*—Robert Beatty
(74) *Attorney, Agent, or Firm*—Oblon, Spivak, McClelland, Maier & Neustadt, P.C.

(57) ABSTRACT

A color image forming apparatus capable of efficiently sensing a color deviation and accurately correcting for it is disclosed. The apparatus includes mark sensing device for sensing register marks on a conveyor belt for determining deviations between colors, a first storage device for storing data representative of the results of past color deviation sensing operations, a recognizing device which recognizes a condition inside the apparatus (e.g. temperature), and a second storage device which stores deviations sensed by the mark sensing device and the apparatus condition in which the deviation occurred. The apparatus will correct for a color deviation on the basis of the stored data in the first storage device. In addition, the timing for executing a sensing operation is determined on the basis of the data stored in the second storage device. Thus the apparatus can execute efficient correction with a minimum frequency of correction in accordance with the variation of the above stored data.

10 Claims, 9 Drawing Sheets

MAIN SCANNING DIRECTION

COLOR IMAGE FORMING APPARATUS CAPABLE OF EFFICIENTLY SENSING A COLOR DEVIATION AND ACCURATELY CORRECTING IT

BACKGROUND OF THE INVENTION

The present invention relates to a color printer, color copier or similar electrophotographic color image forming apparatus and more particularly to a color image forming apparatus capable of sensing the misregister of colors and correcting it.

A color image forming apparatus of the kind described includes a plurality electrophotographic image forming sections arranged along a conveyor belt. Images formed by the image forming sections are sequentially transferred to a paper or similar recording medium being conveyed by the conveyor belt one above the other, completing a color image on the paper. A problem with an electrophotographic image forming apparatus is that the dimensional errors of mechanisms and the errors of a driveline cause a toner image to be formed at a position different from an expected position, resulting in irregular images. Particularly, in a color image forming apparatus sequentially transferring images of different colors to a single recording medium one above the other, the relative positional deviation of the images of different colors occurs. The deviation directly translates into a conspicuous color deviation and degrades image quality to a critical degree. This is particularly true with a full-color image forming apparatus including a plurality of photoconductive elements.

More specifically, in the above color image forming apparatus, the distance between the axes of nearby photoconductive elements is not constant throughout the image forming sections. Further, the degree of parallelism differs from one photoconductive element to another photoconductive element. Moreover, exposing devices involve various errors including the positional error of optics including a mirror and an error in write timing. These errors cause the toner images of different colors, or toner, to be deviated from each other on a paper. Although such misregister may be corrected by initial adjustment, it again occurs later due to the displacement of an image forming unit accommodating the image forming sections, maintenance, transport and so forth. In addition, the errors vary with the elapse of time due to the thermal expansion of mechanisms ascribable to temperature elevation that is caused by repeated image formation. It follows that the apparatus must be adjusted at short intervals.

To solve the above problem, Japanese Patent No. 2,633,877, for example, discloses a color misregister sensing and correcting method using register marks, or toner marks, and a mark sensor. The mark sensor, implemented by a CCD image sensor by way of example, senses the register marks formed on a conveyor belt so as to recognize the positions of images of different colors. However, this method is not practicable without allocating a substantial period of time for the operation for sensing and correcting a color deviation and is therefore likely to lower image forming efficiency, as will be described specifically later.

In light of the above, various implementations for promoting efficient register of images of different colors have been proposed in relation to a color image forming apparatus. For example, Japanese Patent Laid-Open Publication No. 6-51607 proposes to execute frequent correction when the deviation of register noticeably varies or increase the intervals between correction when the deviation is small. Japanese Patent Laid-Open Publication No. 7-234612 proposes to form, when the number of prints exceeds a preselected number in a repeat print mode or when the output of an environment sensor exceeds a preselected value, a pattern image between consecutive papers so as to sense and correct misregister. Japanese Patent Laid-Open Publication No. 8-272936 proposes to sense temperature in an exposing section and temperature around an apparatus and control a correcting operation on the basis of a different between them. Further, Japanese Patent Laid-Open Publication No. 9-244332 proposes to control a correction timing by selectively using sequentially varying preselected intervals and a constant interval.

The above conventional schemes are directed toward an optimal register timing that implements efficient register. Even such schemes, however, bring about the scatter of the results of sensing and cannot easily estimate a timing for correction on the basis of the previous correction.

Technologies relating to the present invention are also disclosed in, e.g., Japanese Patent Laid-Open Publication No. 10-213943.

SUMMARY OF THE INVENTION

It is therefore an object of the present invention to provide a color image forming apparatus capable of efficiently sensing a color deviation and accurately correcting it. A color image forming apparatus of the present invention includes a plurality of electrophotographic image forming sections arranged along a conveyor belt for forming images, and sequentially transfers the images to a single recording medium being conveyed by the conveyor belt one above the other to thereby form a color image on the medium. A register mark forming device causes each of the image forming sections to form a respective register mark on the conveyor belt. A mark sensor adjoins the conveyor belt for sensing the register mark. A correcting device corrects a deviation between colors in accordance with the result of sensing of the register mark output from the mark sensor. A storage stores past deviations between colors sensed by the mark sensor. The correcting device executes the correction of a deviation between colors on the basis of the past deviations stored in the storage.

BRIEF DESCRIPTION OF THE DRAWINGS

The above and other objects, features and advantages of the present invention will become more apparent from the following detailed description taken with the accompanying drawings in which.

DESCRIPTION OF THE PREFERRED EMBODIMENT

Figure 1:
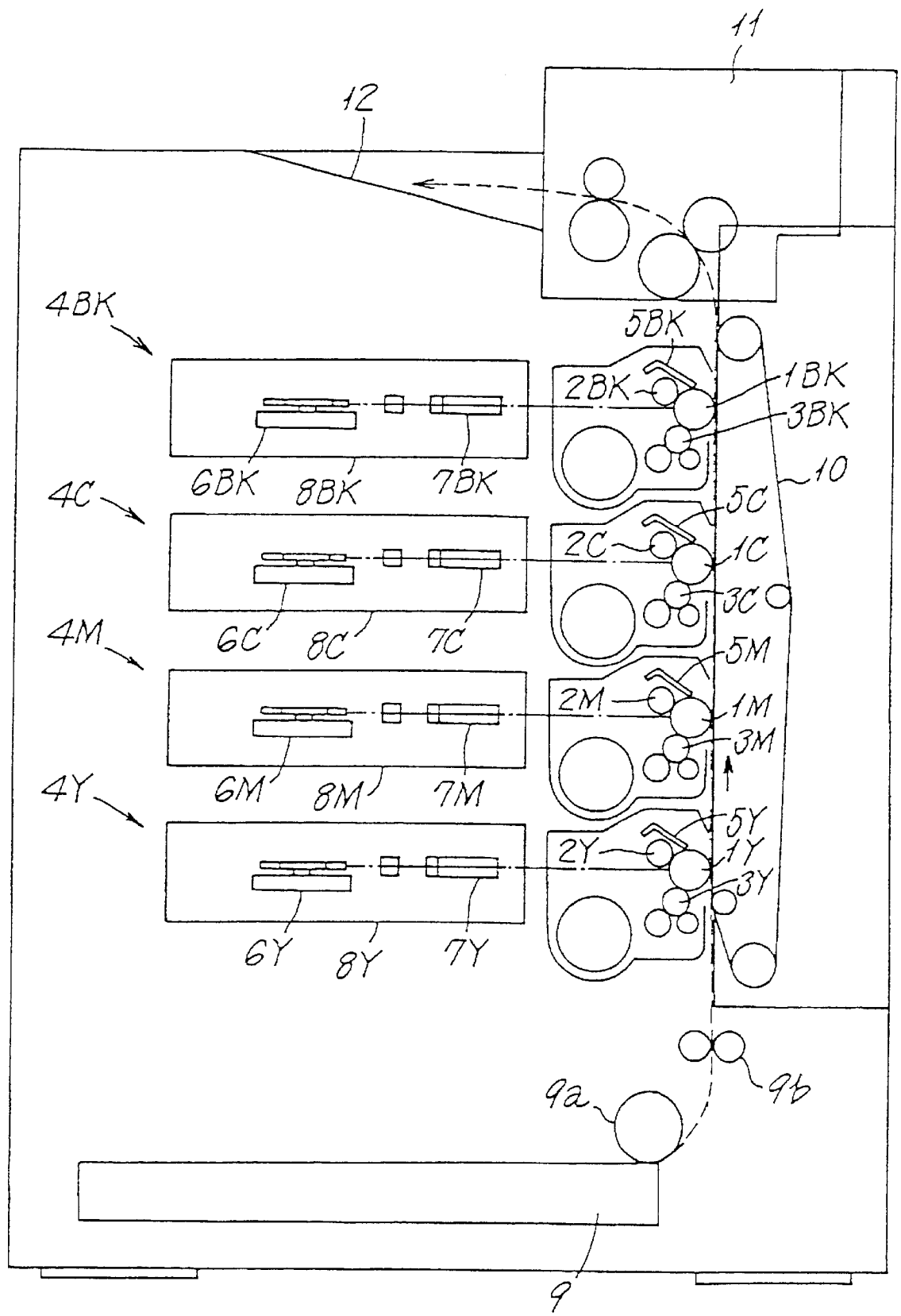
FIG. 1 shows the general construction of a color image forming apparatus to which the present invention is applied.

To better understand the present invention, reference will be made to a full-color image forming apparatus to which the present invention is applied, shown in FIG. 1. As shown, the full-color image forming apparatus includes a paper feed section 9 and a paper discharge section 12. A paper transport path extends from the paper feed section 9 to the paper discharge section 12 via a conveyor belt 10 and a fixing unit 11, as indicated by a dashed line in FIG. 1. Image forming means includes image forming sections 4Y (yellow), 4M (magenta), 4C (cyan) and 4BK (black) and exposing devices that will be described specifically later. The image forming sections 4Y, 4M, 4C and 4BK develop latent images with Y toner, M toner, C toner and BK toner, respectively. Specifically, while a paper or similar recording medium fed from the paper feed section 8 is conveyed along the paper transport path, the image forming sections 4Y through 4BK each transfer toner of particular color to the paper. As a result, a composite or full-color image is formed on the paper.

More specifically, the image forming section 4Y includes an image carrier implemented as a photoconductive drum 1Y and a charger 2Y, a developing device 3Y and an exposing device 8Y arranged around the drum 1Y. After the charger 2Y has uniformly charged the surface of the drum 1Y, the exposing device 8Y exposes the charged surface of the drum 1Y imagewise so as to electrostatically forms a latent image. The developing device 3Y develops the latent image with Y toner to thereby form a corresponding black toner image. Likewise, the image forming sections 4M, 4C and 4BK respectively include photoconductive drums 1M, 1C and 1BK, chargers 2M, 2C and 2BK, developing devices 3M, 3C and 3BK, and exposing devices 8M, 8C and 8BK, and each operates in the same manner as the image forming section 4Y except for the color of toner. The resulting Y, M, C and BK toner images are sequentially transferred from the drums 1Y through 1BK to a paper one above the other. Cleaning devices 5Y, 5M, 5C and 5BK each remove the toner left on associated one of the drums 1Y through 1BK after the image transfer.

Color signals output from a personal computer or an image scanner, not shown, and each being representative of a particular color component are input to an image processing section not shown. The image processing section transforms the color signals to Y, M, C and BK color image data on the basis of their intensity levels. The Y, M, C and BK color image data are respectively delivered to the image forming sections 4Y, 4M, 4C and 4BK. In response, the exposing devices 8Y through 8BK each expose associated one of the drums 1Y through 1BK.

The exposing devices 8Y through 8BK are identical in configuration and implemented by laser scanners by way of example. Specifically, in the exposing device 8Y, a polygonal scanner 6Y steers a laser beam issuing from a laser while an fθ lens or similar focusing optical element 7Y bends the optical path and restricts the diameter of the beam. The beam output from the fθ lens 7Y exposes the charged surface of the drum 1Y. A latent image is written in the main scanning direction parallel to the axis of the drum 1Y due to the rotation of the polygonal scanner 6Y and written in the subscanning direction perpendicular to the above axis due to the rotation of the drum 1Y. The other exposing devices 8M through 8BK respectively include polygonal scanners 6M through 6BK and fη lenses 7M through 7BK that operate in the same manner as the polygonal scanner 6Y and fη lens 7Y, respectively.

The paper feed section 9 includes a pickup roller 9a for paying out a paper toward a registration roller pair 9b. To bring the toner images of different colors into accurate register, times for starting exposure are set such that the delivery of a paper from the paper feed section 9 to the consecutive image transfer positions effected by the conveyor belt 10 and the movement of the toner images formed on the drums 1Y through 1BK to the image transfer positions coincide in timing with each other. The paper carrying the full-color toner image is conveyed to the fixing unit 11 and has the toner image fixed thereby. The paper with the fixed toner image is driven out to a tray 12.

In the above color image forming apparatus, the distance between the axes of the nearby drums is not constant throughout the image forming sections, as stated earlier. Further, the degree of parallelism differs from one drum to another drum. Moreover, the exposing devices 8Y through 8BK involve various errors including the positional error of optics including a mirror and an error in write timing. These errors cause the toner images of different colors, or toner, to be deviated from each other on a paper. Although the deviation may be corrected by initial adjustment, it again occurs later due to the displacement of an image forming unit accommodating the image forming sections, maintenance, transport and so forth. In addition, the errors vary with the elapse of time due to the thermal expansion of mechanisms ascribable to temperature elevation that is caused by repeated image formation. It follows that the apparatus must be adjusted at short intervals.

Figure 2:
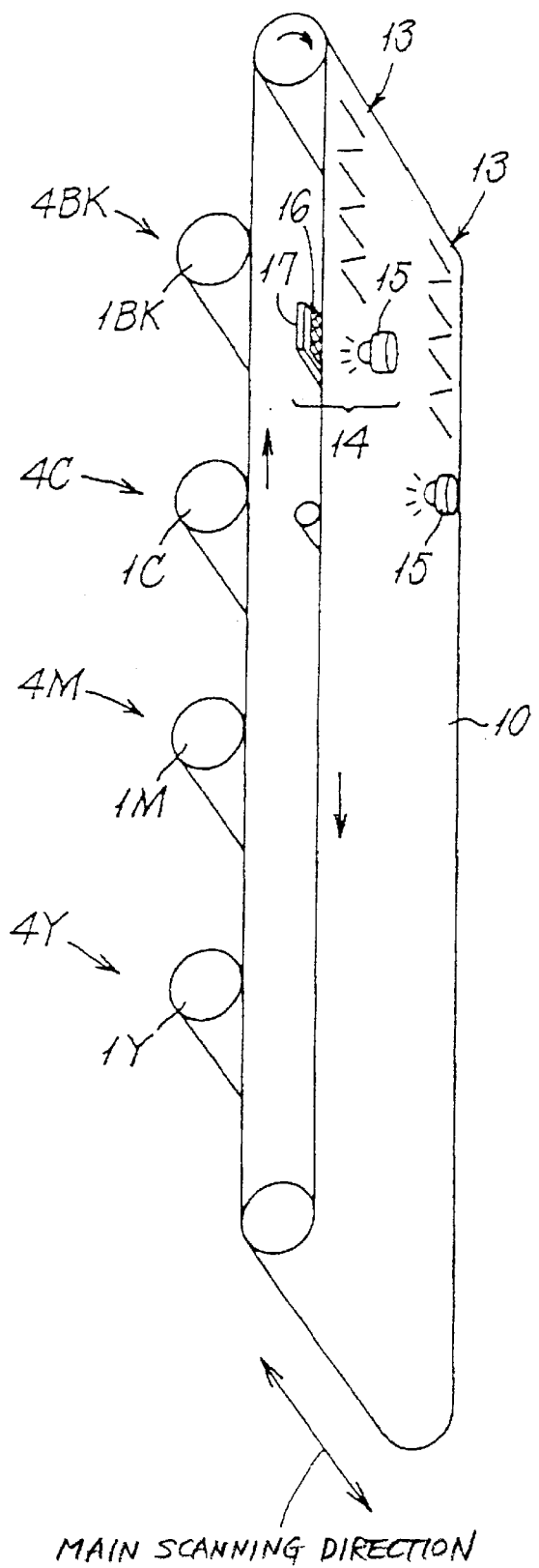
FIG. 2 is a perspective view showing specific register marks formed on a conveyor belt included in the image forming apparatus and specific mark sensing means for sensing the register marks.

FIG. 2 demonstrates a method of detecting and correcting a color deviation taught in Japanese Patent No. 2,633,877 mentioned earlier as a solution to the above problem. Specifically, FIG. 2 shows only essential arrangements around the conveyor belt 10 shown in FIG. 1. As shown, register marks, or toner marks, of different colors 13 are transferred from the drums 1Y through 1BK to the belt 10. A mark sensor 14 adjoins the most downstream portion of the conveyor belt 10 for sensing the register marks 13. In the illustrative embodiment, the conveyor belt 10 is formed of a transparent material, and the register marks 13 are formed on the opposite edge portions of the belt 10 in the main scanning direction. Therefore, two mark sensors 14 adjoin the opposite edge portions of the belt 10, as illustrated. The mark sensors 14 each are made up of a light emitting element 15, a slit 16, and a photosensitive element 17.

Figure 3:
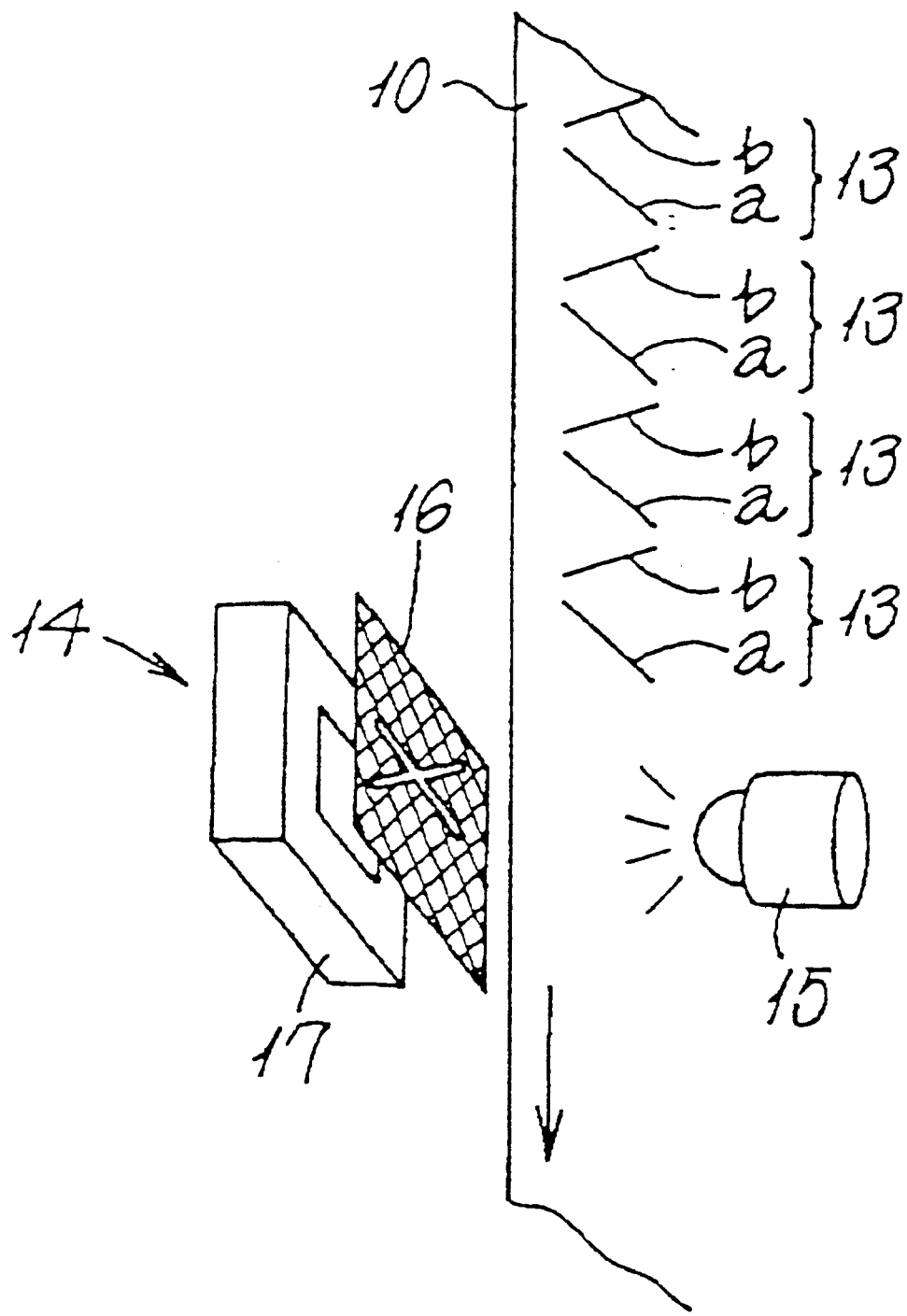
FIG. 3 is an enlarged view showing the mark sensing means in detail.

One of the two mark sensors 14 is shown in FIG. 3 in an enlarged scale. As shown, each register mark 13 formed on the conveyor belt 10 in a particular color is implemented as a line a parallel to the main scanning direction and a line b inclined by a particular angle, e.g., 45° relative to the main scanning direction. The mark sensor 14 senses a deviation in the subscanning direction on the basis of the lines a and senses a deviation in the main scanning direction on the basis of the lines b.

The slit 16 and photosensitive element 17 included in the mark sensor 14 face each other with the intermediary of the conveyor belt 10. For the photosensitive element 15, use is made of an LED (Light Emitting Element) for illuminating the register marks 13 formed on the belt 10. The slit 16 is implemented by a window formed in a light-shielding plate and matching in configuration with each register mark 13. The photosensitive element 17 is implemented by a photodiode (PD) to which light issuing from the LED is incident via the window of the slit 16.

When a portion of the conveyor belt 10 where the register marks 13 are absent arrives at the mark sensor 14, the photosensitive element 17 directly receives light transmitted through the transparent belt 10 via the slit 16. When a portion of the belt 10 where any one of the register marks 13 is present arrives at the mark sensor 14, the photosensitive element 17 receives light shielded by the mark 13 when the mark 13 aligns with the slit 16. The mark sensor 14 therefore determines the time when the register mark 13 passed on the basis of a difference between the quantities of light incident to the photosensitive element 17.

Figure 4:
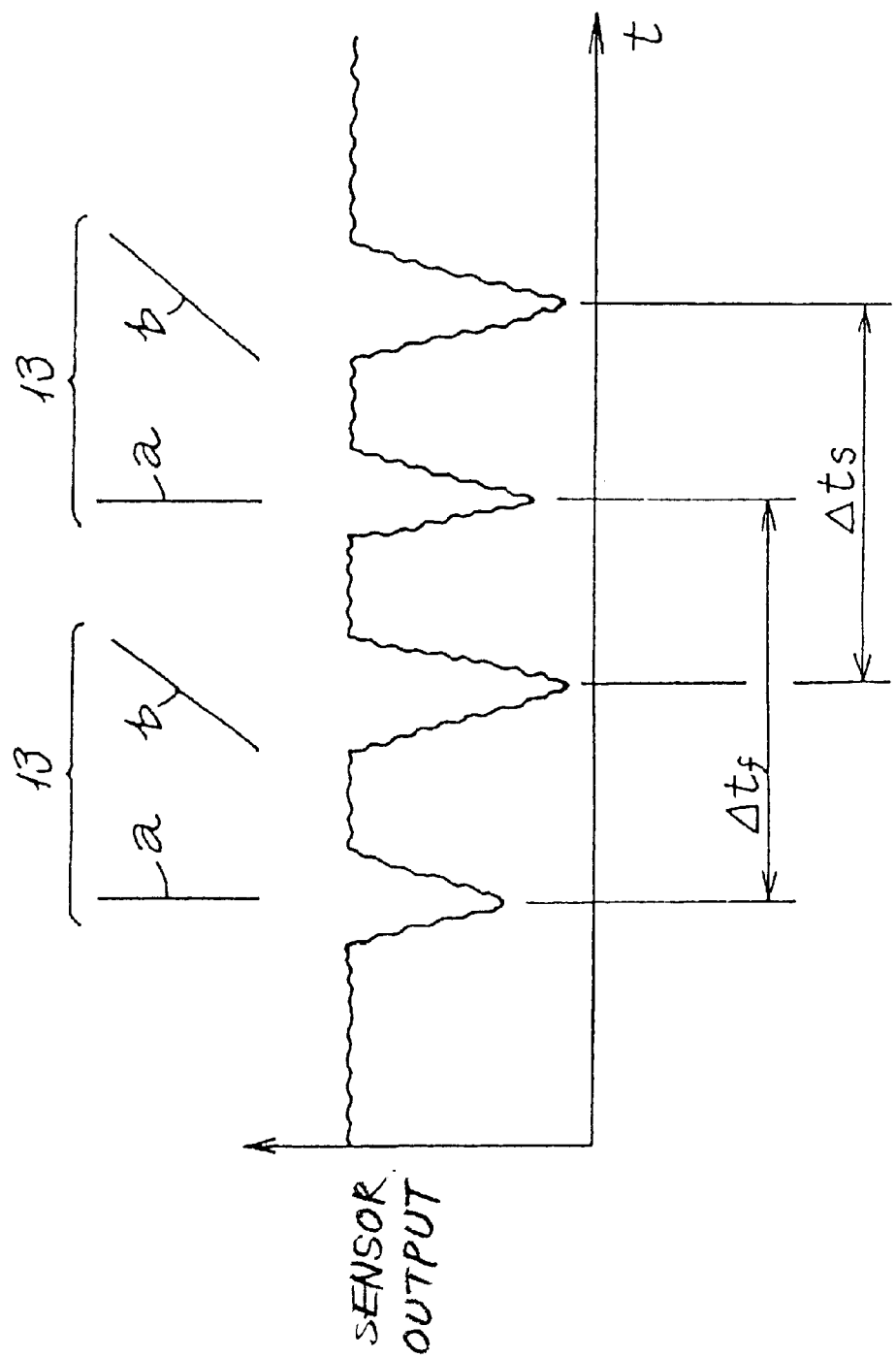
FIG. 4 shows the register marks and a signal output from the mark sensing means.

FIG. 4 shows a specific waveform of a signal output from the mark sensor 14. This signal is sent to a control unit included in the image forming apparatus and having a CPU (Central Processing Unit), a RAM (Random Access Memory), a ROM (Read Only Memory), an I/O (Input/Output) circuit), a clock generator, a counter, and various control circuits, although not shown specifically. The control unit determines a deviation in the subscanning direction on the basis of a difference $\Delta tf$ between the consecutive lines a parallel to the main scanning direction, i.e., perpendicular to time t with respect to the time when a peak appears. Likewise, the control unit determines a deviation in the main scanning direction on the basis of a difference $\Delta ts$ between the consecutive inclined lines b with respect to the peak. This principle is also applied to the calculation of the inclination of a scanning line and the deviation of a magnification.

The control unit executes correction in accordance with the above deviations. As for a skew, for example, the control unit performs the adjustment of the inclination of optical elements included in optics or similar mechanical movement. As for the other correction, the control unit varies the turn-on timing of the light source.

A color image forming apparatus of the type detecting a color deviation and correcting it is apt to lower the image forming efficiency because a substantial period of time must be allocated for the detection and correction, as stated earlier. The method taught in Japanese Patent No. 2,633,877, for example, executes each of a usual image forming sequence and a correction sequence for forming the register marks, reading them and correcting a deviation at a particular timing. This method therefore inhibits the apparatus from forming an image during the formation a register mark at each image forming station, the conveyance of each register mark to the mark sensors, the calculation of a deviation on the basis of the outputs of the mark sensors, and the correction of the deviation.

In light of the above, Japanese Patent Laid-Open Publication Nos. 6-51607, 7-234612, 8-272936 and 9-244332, for example, disclose arrangements for promoting efficient register of toner images of different colors. However, even such arrangements have the following problems (1) and (2) left unsolved.

(1) Scatter of Results of Sensing

Figure 5:
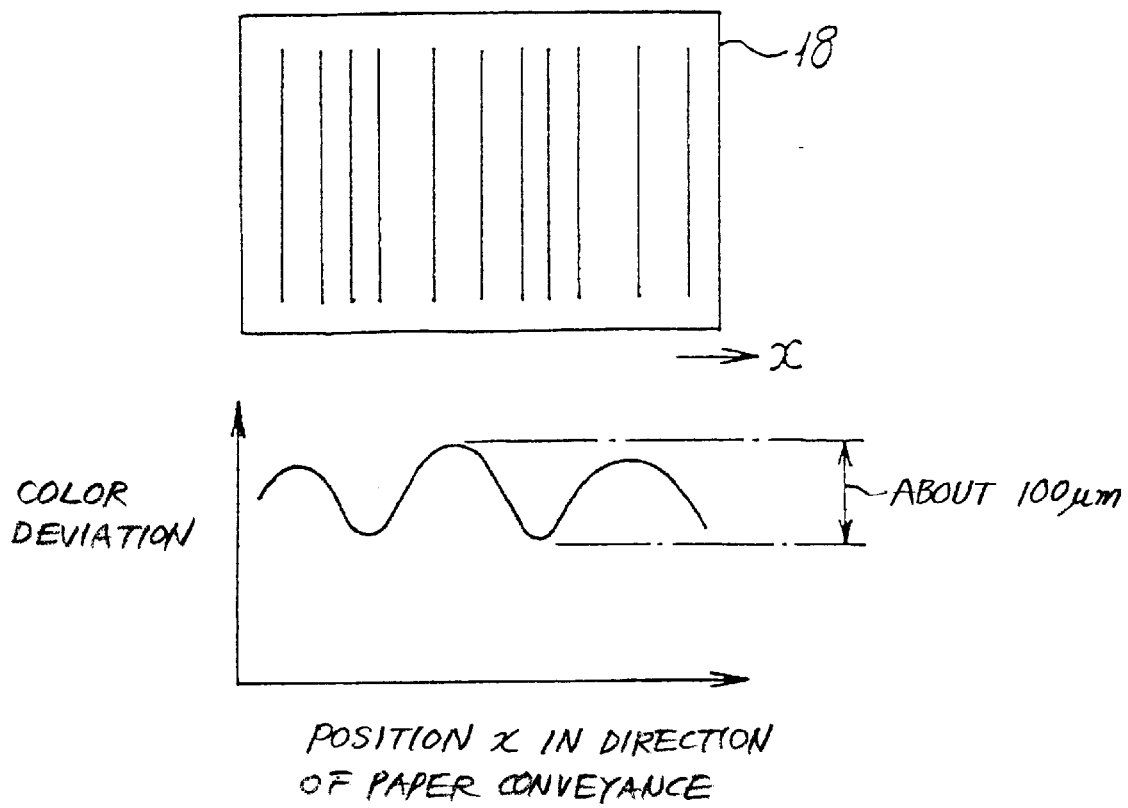
FIG. 5 shows a specific variation of a color deviation with respect to the position on a paper in the subscanning direction.

As shown in FIG. 5, a deviation between colors varies over a range of about 100 $\mu$m due to, e.g., the irregular rotation of a photoconductive drum, depending on the position x in the direction in which a paper 18 is conveyed. It follows that even the result of sensing operation is likely to depend on the position where the register mark is sampled. In addition, even when sensing operations are effected at substantially the same time, the results of sensing are often different from each other due to the scatter of mechanical movements and the repetition error of the sensors. If a deviation varying over a certain range is directly corrected, then even the result of sensing happened to be shifted from the center value is corrected, aggravating the misregister of images. As a result, even correction based on a detected deviation exceeding the resolution for correction would fail to cause the deviation; to converge.

(2) Decision of Time for Sensing Based on Previous Correction

Figure 6:
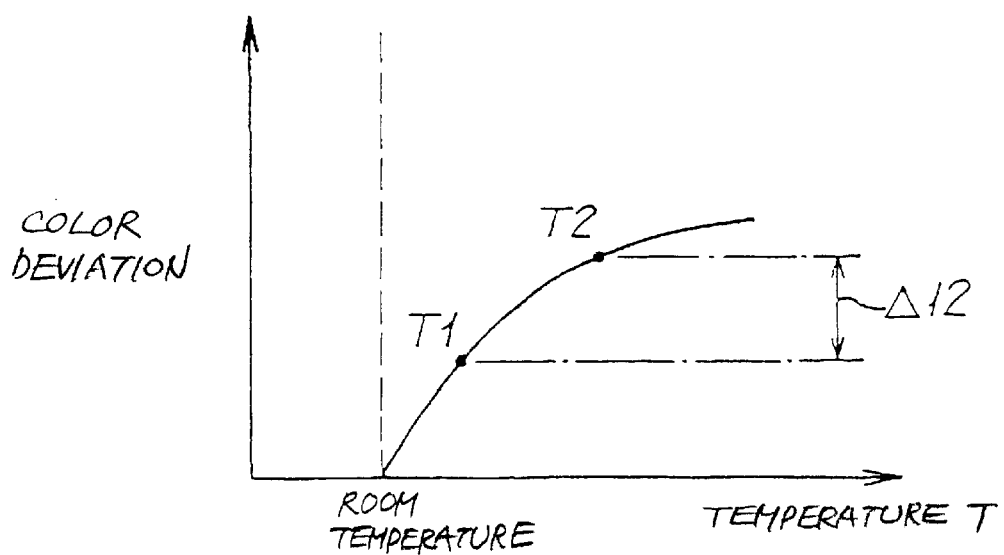
FIG. 6 is a graph showing a relation between temperature inside the image forming apparatus and the amount of color deviation.
Figure 7:
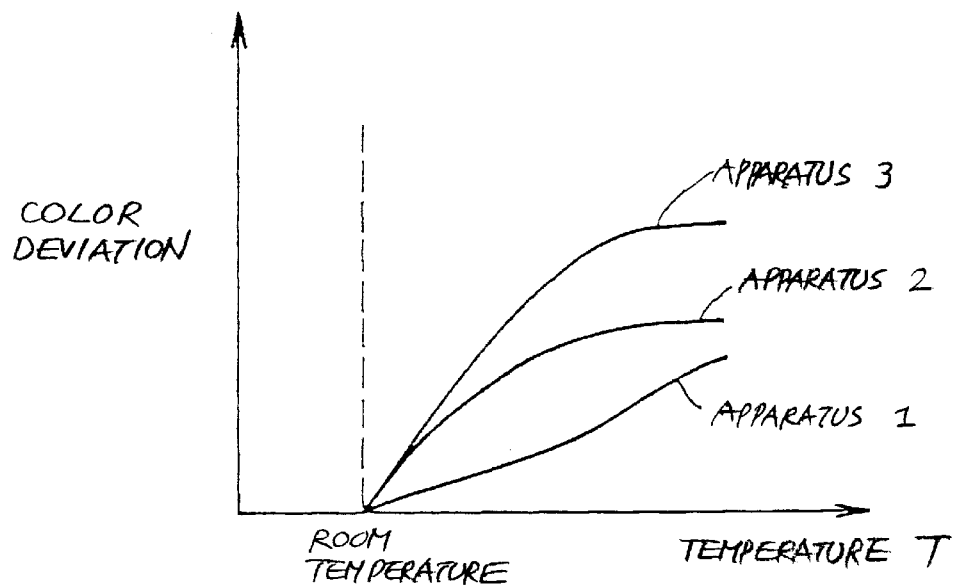
FIG. 7 is a graph showing differences in color deviation curve between image forming apparatuses.

The time for efficient correction after the previous correction should be one in which conditions inside the apparatus have changed to bring about a deviation great enough to need correction. For example, as shown in FIG. 6, assume that a deviation was corrected when temperature was T1. Then, a deviation $\Delta 12$ is assumed to occur at a temperature T2 higher than the temperature T1. The deviation is great when temperature is low, but small when it is high. Temperature therefore does not indicate the degree of deviation alone. That is, it is impossible to determine temperature at which sensing and correction should be effected, unless at least the temperature T1 at which the previous correction was effected is memorized. Moreover, as shown in FIG. 7 specifically, the relation between the amount of deviation and the temperature inside the apparatus depends on the scatter of the assembly and the configuration of the individual structural element.

A preferred embodiment of the color image forming apparatus in accordance with the present invention will be described hereinafter. Basically, the illustrative embodiment also has the construction shown in FIG. 1 and forms an image in the same manner as described in relation to the conventional arrangement. Further, the illustrative embodiment senses the register marks 13 with the same configuration and procedure as described with reference to FIGS. 2 and 3. The following description will therefore concentrate on part of the detection and correction of color deviations unique to the illustrative embodiment.

With the color image forming apparatus shown in FIGS. 1 through 3, it is possible to determine a deviation by executing the previously described color deviation sensing operation. As for the kinds of data, the deviations include a deviation or shift in the main scanning direction, a deviation in magnification in the main scanning direction, and a deviation in the inclination of a scanning line (skew). While such deviation data are output between BK and C, between BK and M and between MK and Y, let the following description concentrate on a deviation in the subscanning direction between BK and C for the sake of simplicity.

Assume that a deviation in the subscanning direction between BK and C determined by the first sensing of the registration marks is $\delta 1$. It is impossible to correct even the smallest deviation $\delta 1$. Specifically, as shown in FIGS. 1 and 2, assume that the C toner image formed by the C image forming section 4C is deviated from the BK toner image formed by the BK image forming section 4BK downward by about n scanning lines. Then, to correct the deviation, the time for starting writing a C image is advanced by n scanning lines. Therefore, the minimum amount of correction (resolution for correction) in the subscanning direction is equal to the distance between scanning lines. To reduce the deviation δ1 in the subscanning direction by such correction, the absolute value of the deviation δ1 must be greater than one half of the distance between scanning lines:

$$|\delta 1|>d/2=L1 \qquad \text{Eq.(1)}$$

where d denotes the resolution for correction (minimum distance between scanning lines) while L1 denotes the correctable borderline.

As the above Eq. (1) indicates, the resolution for correction d is determined by pixel density in the subscanning direction. When the distance between scanning lines is 40 μm by way of example, the correctable border line L1 is greater than ±20 μm. Stated another way, deviations smaller than 20 μm cannot be reduced. It follows that when the deviation sensed is smaller than L1, it is not necessary to execute correction.

On the other hand, the deviation in an image area generally varies in the subscanning direction due to the irregular rotation of photoconductive elements, among others, as shown in FIG. 5. While the amplitude of the variation shown in FIG. 5 depends on the oscillation of photoconductive elements and the accuracy of drive, it is about 100 μm in terms of a peak-to-peak value at the present stage of development. It is therefore necessary to, e.g., sample the register mark 13 at a plurality of points over a certain range in the subscanning direction and average the sampled values to estimate the center value of deviation.

However, even if the register mark 13 is sampled at a plurality of points, the deviation varies, if a little, depending on the sampling points. This, coupled with irregularities in the drive of a driveline and the repetition error of the mark sensors 14, causes the results of a plurality of sensing operations to involve scatter. It is therefore impossible to determine whether or not correction will be effective even if the deviation δ1 is greater than L1 or to determine, even if correction is effective, whether or not the correction by δ1 will be adequate.

On the other hand, correction is effective if the deviation δ1 is greater than a certain value which will be significant even in consideration of the scatter of the apparatus. Theoretically, the precondition of such a value is that the absolute value of the deviation 1 be greater than he sum of the resolution for correction and the standard deviation of the deviations during repeated operation:

$$|\delta 1|>L1+\sigma=Lh \qquad \text{Eq. (2)}$$

where σ denotes the standard deviation while Lh denotes the border line as to the need for immediate correction.

As the Eq. (2) indicates, when L1 is 20 μm and when σ is 20 μm, Lh is 40 μm. Therefore, the value at which correction should be immediately executed is greater than 40 μm.

Figure 8:
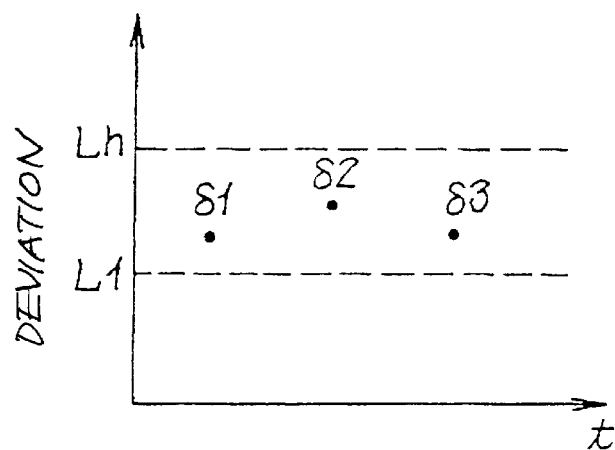
FIG. 8 is a plot showing specific significant deviations sensed at preselected intervals.
Figure 9:
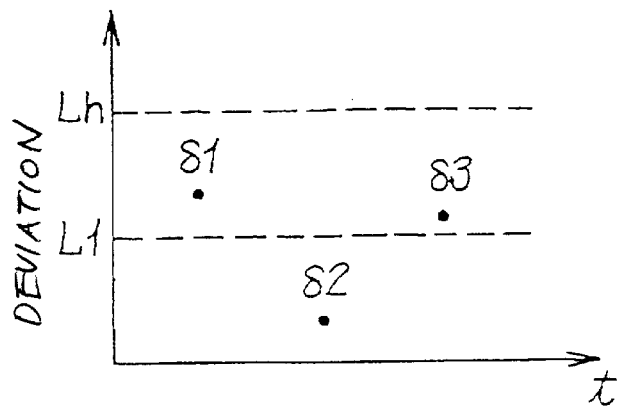
FIG. 9 is a plot showing specific insignificant deviations sensed at reselected intervals.

As stated above, correction is immediately executed if the absolute value of the deviation δ1 is greater than Lh, but not executed if it is smaller than L1. The questionable range of the deviation δ1 is between L1 and Lh. In this case, correction is postponed, and whether or not correction is necessary is determined by taking account of data resulting from the next sensing operation. For example, as shown in FIG. 8, assume that deviations δ1, δ2 and δ3 lying in the range of from L1 to Lh were determined by three consecutive times of sensing. Then, correction is executed. However, as shown in FIG. 9, when the three consecutive deviations δ1 through δ3 are not significant, correction is not executed. In this specific case, the amount of correction may be determined on the basis of a mean value of the data.

Figure 10:
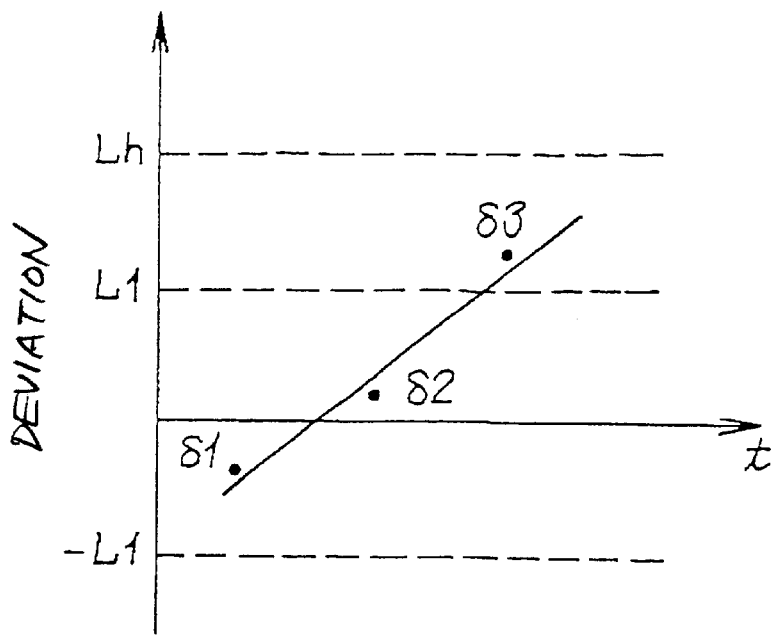
FIG. 10 is a plot showing specific deviations sensed at preselected intervals and sequentially varying in one direction.

Further, assume that the deviation tends to sequentially increase, as indicated by δ1 through δ3 in FIG. 10. Then, a certain weight function, e.g., the linear approximation equation based on the method of least squares is set in place of the mean value of data and calculated to determine a correction value. By so determining an amount of correction by a plurality of different calculations, it is possible to further enhance accurate register.

For the above purpose, a memory for storing consecutive data must be built in the control unit of the apparatus. The memory may be implemented by the previously mentioned RAM or the ROM of the control unit or an exclusive memory. The consecutive deviations (δ1, δ2, δ3 and so forth) and the times t when they were determined are written to the memory. The illustrative embodiment described with reference to FIGS. 8 through 10 determines deviations δ at preselected intervals with respect to the time t (abscissa) since the power-up of the apparatus. The time t may be replaced with any other factor closely related to color misregister, e.g., the number of prints output or temperature inside the apparatus, if desired.

The causes of the color misregister to occur in the apparatus of FIG. 1 include the variation of conditions within the apparatus. Major one of such conditions is temperature in the apparatus. Specifically, when temperature inside the apparatus rises, various sections of the apparatus thermally expand and vary, e.g., the distance between adjoining ones of the image forming sections 4BK through 4Y. FIG. 6 shows a curve representative of a relation between temperature inside the apparatus and the deviation to occur after correction effected when the above temperature was room temperature. It follows that if the correlation between the temperature T and the color deviation is determined beforehand, it is possible to estimate the degree of deviation occurred by measuring the temperature T.

In light of the above, the illustrative embodiment additionally includes a thermistor or similar temperature sensor playing the role of means for recognizing an apparatus condition. The temperature sensor is located at a position where temperature variation and color deviation are closely related to each other, e.g., in an optics housing included in any one of he exposing devices 8BK through 8Y. A relation between the above position and the color deviation is estimated beforehand, so that the correlation can be determined in the manner shown in FIG. 6.

Assume that temperature inside the apparatus was T1 at the time of correction effected at a certain time and then raised to T2 on the elapse of a certain period of time, as determined by the temperature sensor. Then, the previously mentioned color deviation Δ12 expected to occur is calculated on the basis of the curve of FIG. 6. Subsequently, a sensing operation is effected as soon as the deviation Δ12 is determined to need correction. This is successful to enhance efficient correction to a considerable degree.

Figure 11:
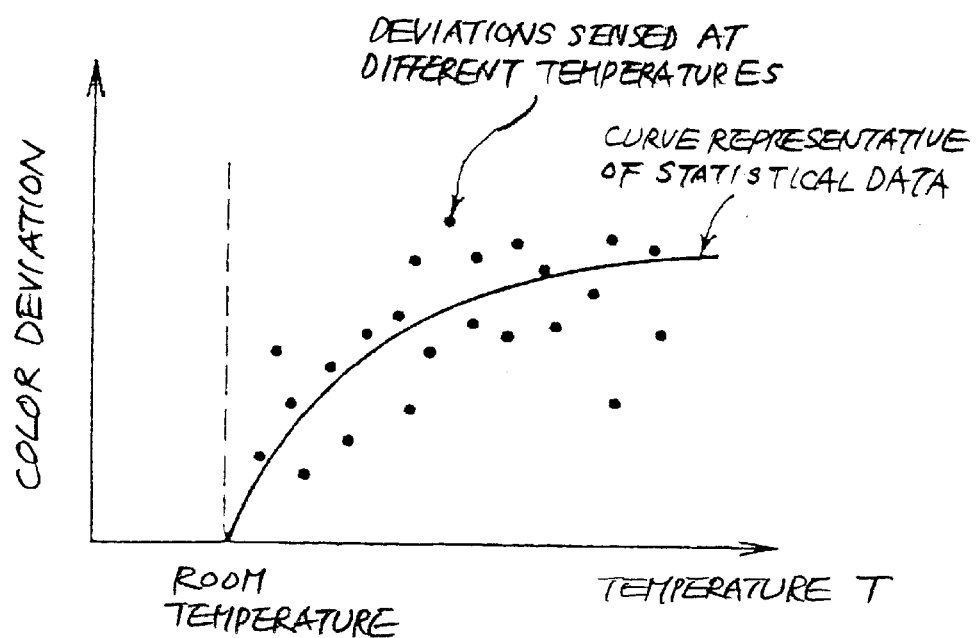
FIG. 11 is a graph showing an approximate deviation curve produced by sampling a plurality of color deviations at different temperatures inside the image forming apparatus.

In practice, as shown in FIG. 11, a plurality of scattered data (color deviations determined at particular temperature each) are sampled and stored and calculated by the control unit so as to produce an approximate curve. Storing means for storing such data should preferably be implemented by a nonvolatile memory capable of holding the data even when the power supply of the apparatus is turned off. The nonvolatile memory capable of storing a plurality of data allows a color deviation to be estimated more accurately as the apparatus is used over a longer period of time.

Assume that a color deviation estimated on the basis of the curve of FIG. 6 is so small and does not critically deteriorate image quality. Then, it is not desirable to execute color deviation sensing that lowers the image forming efficiency, inhibiting the apparatus from forming an image. Moreover, sensing a color deviation before every print job would lower the production efficiency to a critical degree.

Figure 12:
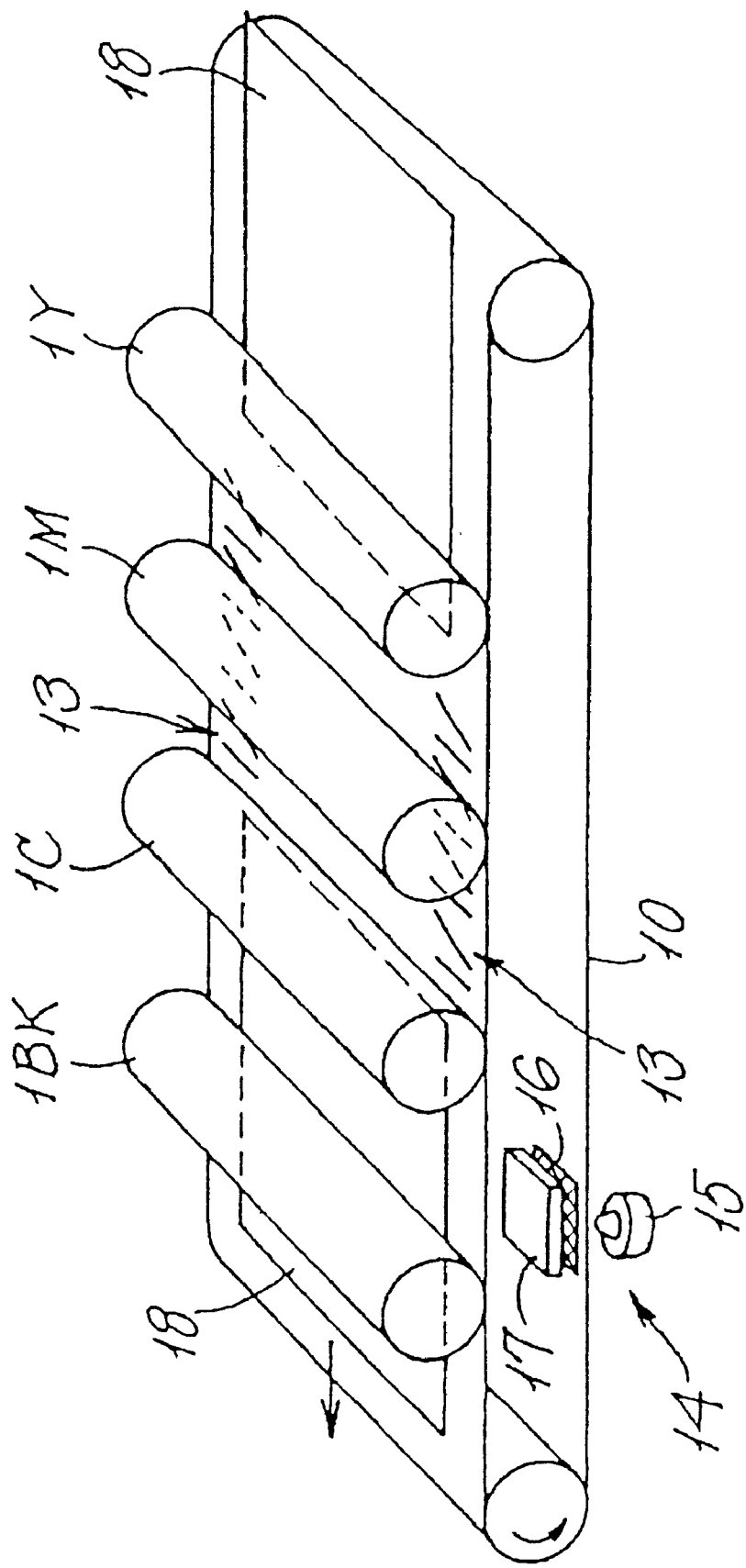
FIG. 12 shows a specific case wherein register marks are formed between consecutive papers in a repeat print mode.

In the illustrative embodiment, so long as the above result of sensing is obtained, the register marks are formed during image formation, e.g., just after the conveyance of a paper and sensed. As shown in FIG. 12, in a repeat print mode, the register marks 13 are formed between the consecutive papers 18 or just after the conveyance of the last paper 18 and conveyed to the mark sensors 14. In this case, as soon as the previously stated deviation δ becomes substantially constantly greater than L1, correction may be effected by interrupting the image formation. By so effecting color deviation sensing during image formation, it is possible to sample deviation data and achieve efficient correction without lowering the image production efficiency.

The apparatus is not always in operation even if it is in a power-up state, but often simply remains idle. Assume that the apparatus in the idle condition is caused to operate to perform frequent sensing due to changes in temperature inside the apparatus. This not only wastes power, but also causes the operator, watching the apparatus in operation, to feel uneasy because of the absence of prints.

Figure 13:
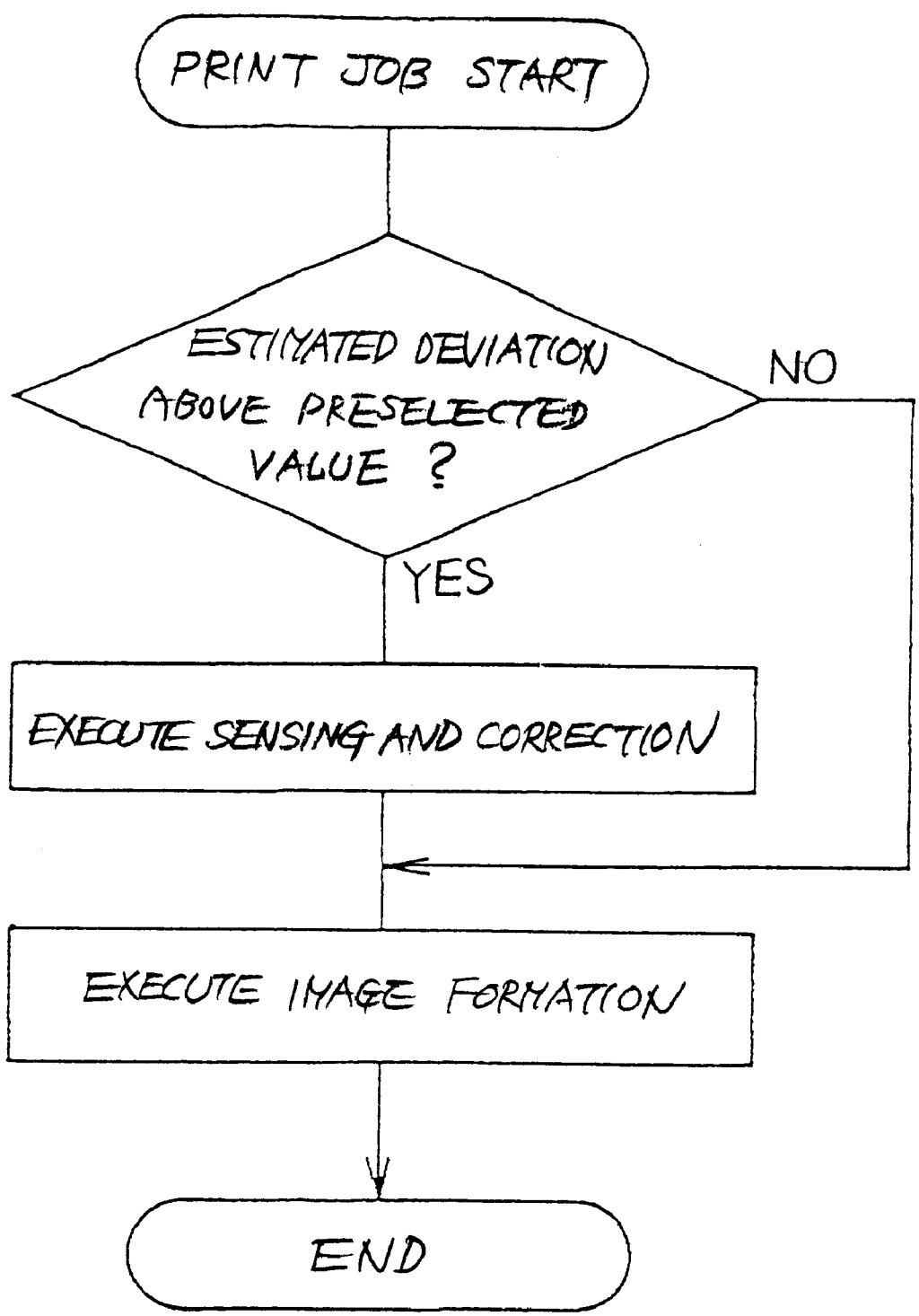
FIG. 13 is a flowchart demonstrating a specific procedure for sensing a color deviation.

To obviate the above occurrence, the register mark sensing operation should preferably be effected in interlocked relation to a print job execute signal input by the user. Specifically, after a print job has been executed, an estimated deviation is determined on the basis of the current apparatus condition (e.g. temperature), the past apparatus conditions, and color deviation data, as stated previously. Subsequently, as shown in FIG. 13 specifically, whether or not the estimated deviation is greater than the preselected value and needs correction is determined. If the answer of this decision is positive (Yes), then the sensing operation is effected before image formation. If the answer of the above decision is negative (No), image formation is executed without any sensing operation; the sensing operation is effected during image formation, as stated above.

In summary, i twill be seen that the present invention provides a color image forming apparatus having various unprecedented advantages, as enumerated below.

(1) The apparatus includes storing means for storing data representative of the results of past color deviation sensing operations and corrects a color deviation on the basis of the stored data. The apparatus can therefore execute efficient correction with accuracy. Also, the apparatus can maintain its performance with a minimum frequency of correction in accordance with the variation of the above data. In addition, the apparatus is free from erroneous correction ascribable to the scatter of the data.

(2) The apparatus stores temperature thereinside or similar apparatus condition recognized together with color deviations associated therewith and recognizes a relation between the variation of the apparatus condition and the amount of color deviation beforehand. The apparatus can therefore accurately estimate whether or not a color deviation needing correction has occurred. This promotes timely sensing and correction.

(3) When the amount of color deviation sensed probably, but not definitely, lies in the range of scatter, sensing register marks by taking an extra period of time would lower production efficiency to a critical degree. So long as the deviation does not need correction, the apparatus forms register marks just after the conveyance of a paper or between consecutive papers. Therefore, with a mode in which the sensing operation is included in a usual image forming operation, the apparatus does not have to wastefully form register marks and can obtain data without lowering production efficiency.

(4) When the operator inputs a print job execute signal, the apparatus determines, before image formation, whether or not the sensing operation is necessary and then executes the sensing operation if it is necessary. This is successful to obviate wasteful operations and power consumption while the apparatus is out of operation, thereby insuring a timely sensing operation.

Various modifications will become possible for those skilled in the art after receiving the teachings of the present disclosure without departing from the scope thereof.

What is claimed is:

1. A color image forming apparatus including a plurality of electrophotographic image forming sections arranged along a conveyor belt for forming images, and sequentially transferring said images to a single recording medium being conveyed by said conveyor belt one above the other to thereby form a color image on said recording medium, said color image forming apparatus comprising:

register mark forming means for causing each of said image forming sections to form a respective register mark on the conveyor belt;

mark sensing means adjoining the conveyor belt for sensing the register mark;

correcting means for correcting a deviation between colors in accordance with a result of sensing of the register mark output from said mark sensing means;

first storing means for storing past deviations between colors sensed by said mark sensing means, wherein said correcting means executing a correction of a deviation between colors on the basis of the past deviations stored in said first storing means;

a recognizing means for recognizing an apparatus condition inside of said apparatus; and second storing means for storing the deviations sensed by said mark sensing means and the apparatus conditions in which said deviations occurred, wherein a timing for executing a sensing operation is determined on the basis of the apparatus condition recognized by said recognizing means and deviations stored in said second storing means in association with past apparatus conditions.

2. An apparatus as claimed in claim 1, wherein the timing for executing a sensing operation is included in a usual image forming sequence.

3. An apparatus as claimed in claim 1, wherein the timing for executing a sensing operation is interlocked to a print job executed signal input by an operator.

4. A color image forming apparatus including a plurality of electrophotographic image forming sections arranged along a conveyor belt for forming images, and sequentially transferring said images to a single recording medium being conveyed by said conveyor belt one above the other to thereby form a color image on said recording medium, said color image forming apparatus comprising:

register mark forming means for causing each of said image forming sections to form a respective register mark on the conveyor belt;

mark sensing means adjoining the conveyor belt for sensing the register mark;

correcting means for correcting a deviation between colors in accordance with a result of sensing of the register mark output from said mark sensing means;

first storing means for storing past deviations between colors sensed by said mark sensing means;

recognizing means for recognizing an apparatus condition inside of said apparatus; and second storing means for storing the deviations sensed by said mark sensing means and the apparatus conditions in which said deviations occurred;

said correcting means executing a correction of a deviation between colors on the basis of the past deviations stored in said storing means;

wherein a timing for executing a sensing operation is determined on the basis of the apparatus condition recognized by said recognizing means and deviations stored in said second storing means in association with past apparatus conditions, and wherein said timing is included in a usual image forming sequence.

5. An apparatus as claimed in claim 4, wherein the timing for executing a sensing operation is interlocked to a print job executed signal input by an operator.

6. A color image forming apparatus including a plurality of electrophotographic image forming sections arranged along a conveyor belt for forming images, and sequentially transferring said images to a single recording medium being conveyed by said conveyor belt one above the other to thereby form a color image on said recording medium, said color image forming apparatus comprising:

register mark forming means for causing each of said image forming sections to form a respective register mark on the conveyor belt;

mark sensing means adjoining the conveyor belt for sensing the register mark;

correcting means for correcting a deviation between colors in accordance with a result of sensing of the register mark output from said mark sensing means;

first storing means for storing past deviations between colors sensed by said mark sensing means, wherein said correcting means executing a correction of a deviation between colors on the basis of the past deviations stored in said first storing means;

a recognizing device for recognizing an apparatus condition inside of said apparatus; and a second storing means for storing the deviations sensed by said mark sensor and the apparatus conditions in which said deviations occurred, wherein a timing for executing a sensing operation is determined on the basis of the apparatus condition recognized by said recognizing device and deviations stored in said second storage in association with past apparatus conditions.

7. An apparatus as claimed in claim 6, wherein the timing for executing a sensing operation is included in a usual image forming sequence.

8. An apparatus as claimed in claim 6, wherein the timing for executing a sensing operation is interlocked to a print job executed signal input by an operator.

9. A color image forming apparatus including a plurality of electrophotographic image forming sections arranged along a conveyor belt for forming images, and sequentially transferring said images to a single recording medium being conveyed by said conveyor belt one above the other to thereby form a color image on said recording medium, said color image forming apparatus comprising:

a register mark forming device for causing each of said image forming sections to form a respective register mark on the conveyor belt;

a mark sensor adjoining the conveyor belt for sensing the register mark;

a correcting device for correcting a deviation between colors in accordance with a result of sensing of the register mark output from said mark sensor;

a first storage for storing past deviations between colors sensed by said mark sensor;

a recognizing device for recognizing an apparatus condition inside of said apparatus; and a second storage for storing the deviations sensed by said mark sensor and the apparatus conditions in which said deviations occurred;

said correcting device executing a correction of a deviation between colors on the basis of the past deviations stored in said first storage;

wherein a timing for executing a sensing operation is determined on the basis of the apparatus condition recognized by said recognizing device and deviations stored in said second storage in association with past apparatus conditions, and wherein said timing is included in a usual image forming sequence.

10. An apparatus as claimed in claim 9, wherein the timing for executing a sensing operation is interlocked to a print job executed signal input by an operator.

* * * * *